(12) United States Patent
May et al.

(10) Patent No.: US 6,271,834 B1
(45) Date of Patent: Aug. 7, 2001

(54) INTEGRATED POINTING DEVICE HAVING TACTILE FEEDBACK

(75) Inventors: Kim Wesley May, San Jose; Edwin Joseph Selker, Palo Alto, both of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/087,747

(22) Filed: May 29, 1998

(51) Int. Cl.[7] .............................. G09G 5/00; G09G 5/08
(52) U.S. Cl. .................. 345/168; 345/157; 345/161; 345/156; 341/22; 341/23; 341/37
(58) Field of Search .................... 345/156–172; 341/22, 23, 37

(56) References Cited

U.S. PATENT DOCUMENTS

| | | | |
|---|---|---|---|
| 4,868,549 | 9/1989 | Affinito et al. ............... | 340/710 |
| 5,532,476 | * 7/1996 | Mikan ........................ | 250/221 |
| 5,541,622 | * 7/1996 | Engle et al. ................. | 345/161 |
| 5,576,704 | * 11/1996 | Baker et al. ................. | 341/20 |
| 5,694,123 | 12/1997 | Selker et al. ................ | 341/22 |
| 5,867,808 | 2/1999 | Selker et al. ................ | 702/41 |
| 5,956,018 | * 9/1999 | Pejic et al. .................. | 345/157 |
| 5,966,117 | * 10/1999 | Seffernick et al. ............ | 345/161 |
| 5,999,168 | * 12/1999 | Rosenberg et al. ............ | 345/161 |

* cited by examiner

*Primary Examiner*—Bipin Shalwala
*Assistant Examiner*—Jimmy H. Nguyen
(74) *Attorney, Agent, or Firm*—Ronald L. Drumheller; Marc D. McSwain

(57) ABSTRACT

An integrated manual control input device is provided for use in a computer system having a graphical user interface. The device comprises a pointing actuator mounted to a computer keyboard between preselected ones of the keys for engagement by a user's index finger. The pointing actuator includes a coil in the form of a cylinder that, when carrying a current, produces a magnetic field to drive a ferromagnetic slug to provide tactile feedback to a user of the control input device.

3 Claims, 3 Drawing Sheets

INTEGRATED POINTING DEVICE HAVING TACTILE FEEDBACK

BACKGROUND OF THE INVENTION

1. Field of the Invention

This invention relates generally to computer systems with graphical user interfaces and, more particularly, to control of computer activities with graphical user interface pointing devices.

2. Description of the Related Art

The interactive computer system operating environment, such as encountered by users of personal computers and the like, is characterized by efforts toward increasing ease of operation and convenience. An important contribution to making the operation of such computers easier and more convenient is the graphical user interface (GUI). A GUI provides a computer interface that is visually oriented and includes a variety of graphical artifacts displayed on a computer display that make the operation of the computer more intuitive and thereby can increase user efficiency.

A GUI operating system enables a user to move a computer display pointer by using a GUI pointing device such as a display mouse or track ball that is attached to the computer. Generating a control input by moving the mouse across a desktop or rolling the track ball in its cradle moves the pointer across the display in the same direction of movement, according to a response function of the pointing device. The relationship between pointing device control input and pointer response on the display screen is intuitive to the user. Many GUI systems permit multiple programs to be represented simultaneously on the computer display as different display windows. The boundaries of the windows can be adjusted or can be reduced to an icon representation. To activate a program, or to re-enter it, a user targets the display pointer within the desired program window or targets the display icon representing the program and presses a button of the display mouse or track ball device. Pressing the button, also referred to as "clicking" it, activates or re-enters the program. To activate a program without the GUI, a user would need to type the name of an executable file and provide it to the operating system. In this way, the keystrokes needed to activate or re-enter a program are eliminated or at least substantially reduced, making the computer easier and more convenient to use. The ability to point to a desired activity makes learning the operation of the computer easier and more convenient.

Additional improvements to program interaction through graphical user interface display pointer control are rapidly being achieved. For example, IBM Corporation has introduced a display pointer control feature called TrackPoint™ that includes a small, substantially rigid joystick-type actuator imbedded in the center of an otherwise conventional "QWERTY" computer keyboard. The TrackPoint control actuator is located between the G, H and B keys, between the hands of a typist at the home position, and is sufficiently short so that it does not interfere with normal typing on the keyboard. A computer user can apply lateral forces to the control actuator with his or her index finger to move the pointer around on the computer display, rather than using a display mouse. The keyboard provided with the TrackPoint feature includes a pair of click buttons below the middle of the space bar that duplicate the function of the display mouse buttons. These buttons are easily depressed with a thumb. In this way, the user's hands do not need to leave the keyboard to control the display pointer. The index finger and thumb of the same hand can simultaneously control the joystick-type actuator and either of the click buttons. A keyboard with such an integrated pointing device is especially desirable in a portable computer, known as a laptop or notebook computer, having a graphical user interface, where it can be inconvenient or difficult to connect and/or use a mouse or track ball with the computer to control display pointer movement. The IBM Corporation notebook computer is commonly referred to as a ThinkPad™ computer and includes a TrackPoint control actuator of the foregoing type.

The TrackPoint control actuator and associated click buttons significantly reduce the time required for a user to select windows, icons, text commands and other displayed features of a GUI over the conventional approach of manipulating a mouse or track ball physically separated from the keyboard. In addition, the TrackPoint control actuator and associated click buttons are particularly well suited for portable computers which are often used in airplanes, automobiles and other locations that do not have sufficient space for operation of a separate mouse or track ball.

The TrackPoint control actuator and associated click buttons which have heretofore been incorporated into commercially available computers sold by IBM Corporation are easy to operate insofar as performing a single click operation. However, there are instances where it is desirable to initiate the click operation from the TrackPoint control actuator itself. In this operation, the user positions the cursor or pointer over an object of interest on the computer display by applying forces with his or her index finger to the joystick-type actuator between the G, H and B keys. The user then depresses and releases the TrackPoint control actuator with his or her index finger in order to initiate a "click". In so doing, the user would then observe the GUI in order to visually determine whether the click had been recognized and accepted by the desired target. Clicking to select can be tedious with the aforementioned TrackPoint control actuator inasmuch as there is no feedback provided to the user that a given action has been accepted.

SUMMARY OF THE INVENTION

It is the primary object of the present invention to provide an improved keyboard with an integrated pointing device that will facilitate a click operation directly from the integrated pointing device itself.

According to the present invention an integrated manual control input device is provided for use in a computer system having a graphical user interface. The device comprises a pointing actuator mounted to the keyboard unit between preselected ones of the keys for engagement by a user's finger; and a magnetic means integrated with said pointing actuator for producing tactile feedback to an operator using the control input device.

DESCRIPTION OF THE PREFERRED EMBODIMENTS

Figure 1:
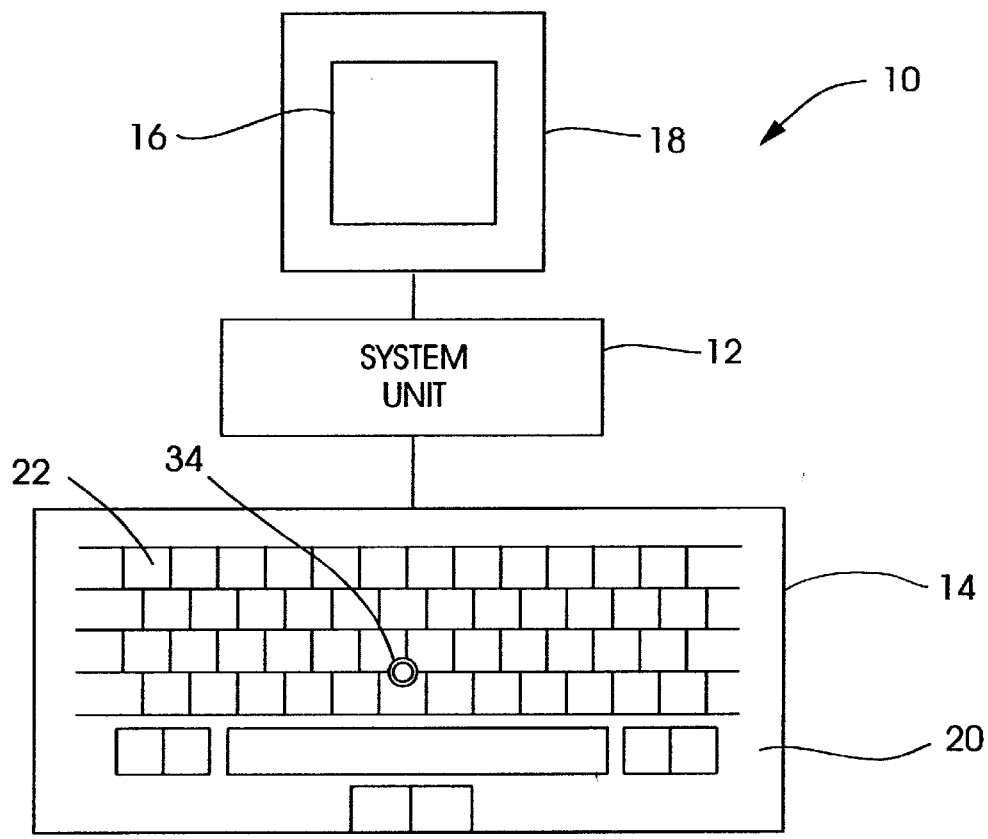
FIG. 1 is a schematic representation of a computer system having a keyboard with an integrated pointing device.

Referring to FIG. 1, a computer system 10 is illustrated which comprises a system unit 12 that receives manual control inputs from an attached keyboard unit 14 and displays system responses on a display screen 16 of a display device 18. The keyboard unit 14 includes a surrounding rectangular frame 20 that supports a plurality of manually depressible keys 22. The keys 22 include the normal twenty-six keys bearing the letters of the alphabet which are arranged in the conventional QWERTY layout. The keys 22 also include conventional F1 through F12 function keys, and other keys such as CAPS LOCK, SHIFT, TAB, BACKSPACE, ENTER and so forth. The keyboard unit 14 further includes a SPACE BAR key 24 a CTRL key 26, and ALT key 28, another ALT key 30 and another CTRL key 32 (not shown).

Figure 2:
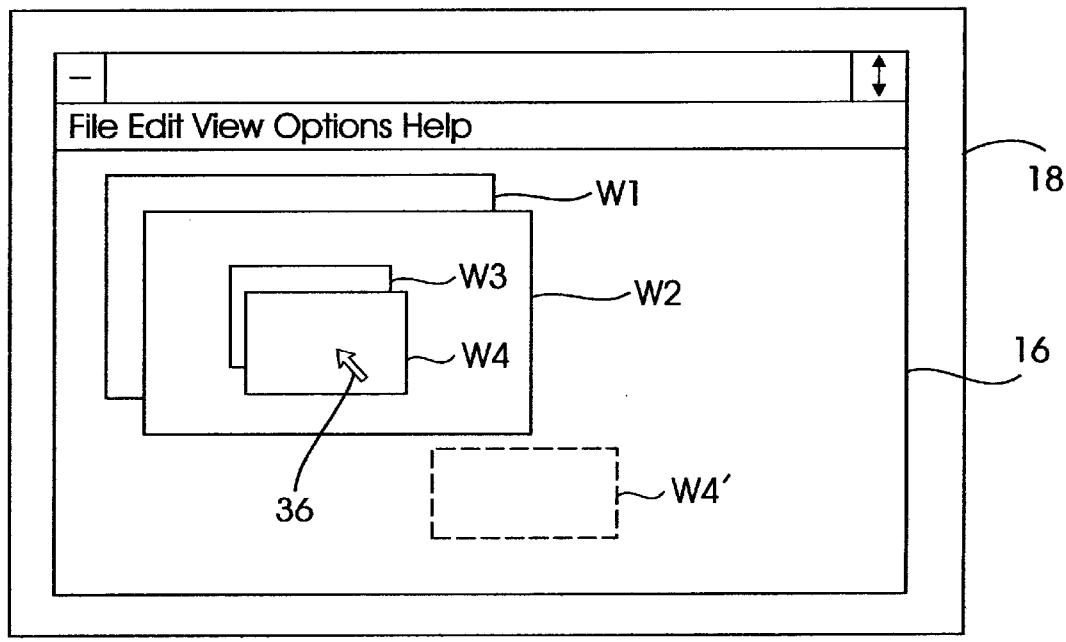
FIG. 2 illustrates a pointer of a graphical user interface which is used to select one of several displayed objects.

The keyboard unit 14 (FIG. 1) has a small, substantially rigid joystick actuator 34 embedded therein between the G, H and B keys. The joystick actuator 34 can be engaged by the tip of the user's index finger and lateral forces applied over a 360° range in the general horizontal plane of the keyboard unit 14 in order to move an active pointer 36 (FIG. 2) across the entire display screen 16. By way of example, this enables the user to select one of the windows W1, W2, W3 and W4 displayed by the GUI. It will be understood that the pointer 36 can also be used to select icons, windows and other commands displayed by the GUI and to designate system tasks, change the display, and so forth.

The joystick actuator 34 preferably comprises a small vertical post with an elastomeric cap on its upper end (not illustrated). The lower end of the post is rigidly secured to a force transducer (not illustrated) preferably in the form of a thin film resistive strain gauge in the manner set forth in U.S. Pat. No. 5,548,529 entitled FORCE TRANSDUCER WITH SCREEN PRINTED STRAIN GAUGES, which is specifically incorporated herein by reference. The aforementioned application is assigned to IBM Corporation, as is the subject application.

Figure 3:
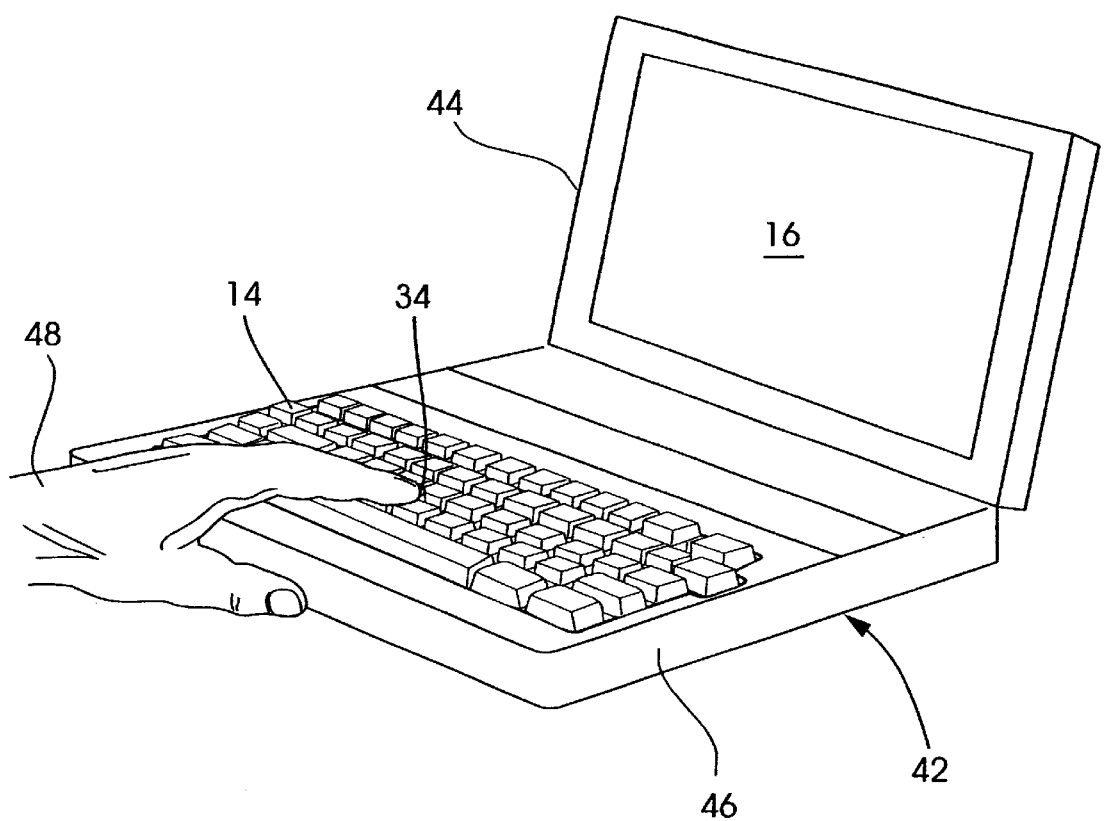
FIG. 3 is a perspective view of a laptop computer having a keyboard with the integrated pointing device.

FIG. 3 illustrates a laptop computer 42 equipped with the keyboard unit 14 and incorporating the display screen 16. The display screen 16 is carried on the inside of a lid 44 which is hingedly attached to the base 46 of the laptop computer. The lid 44 can be closed to conceal the keyboard unit.

In FIG. 3, the index finger of a user's left hand 48 is shown in engagement with the joystick actuator 34.

Figure 4:
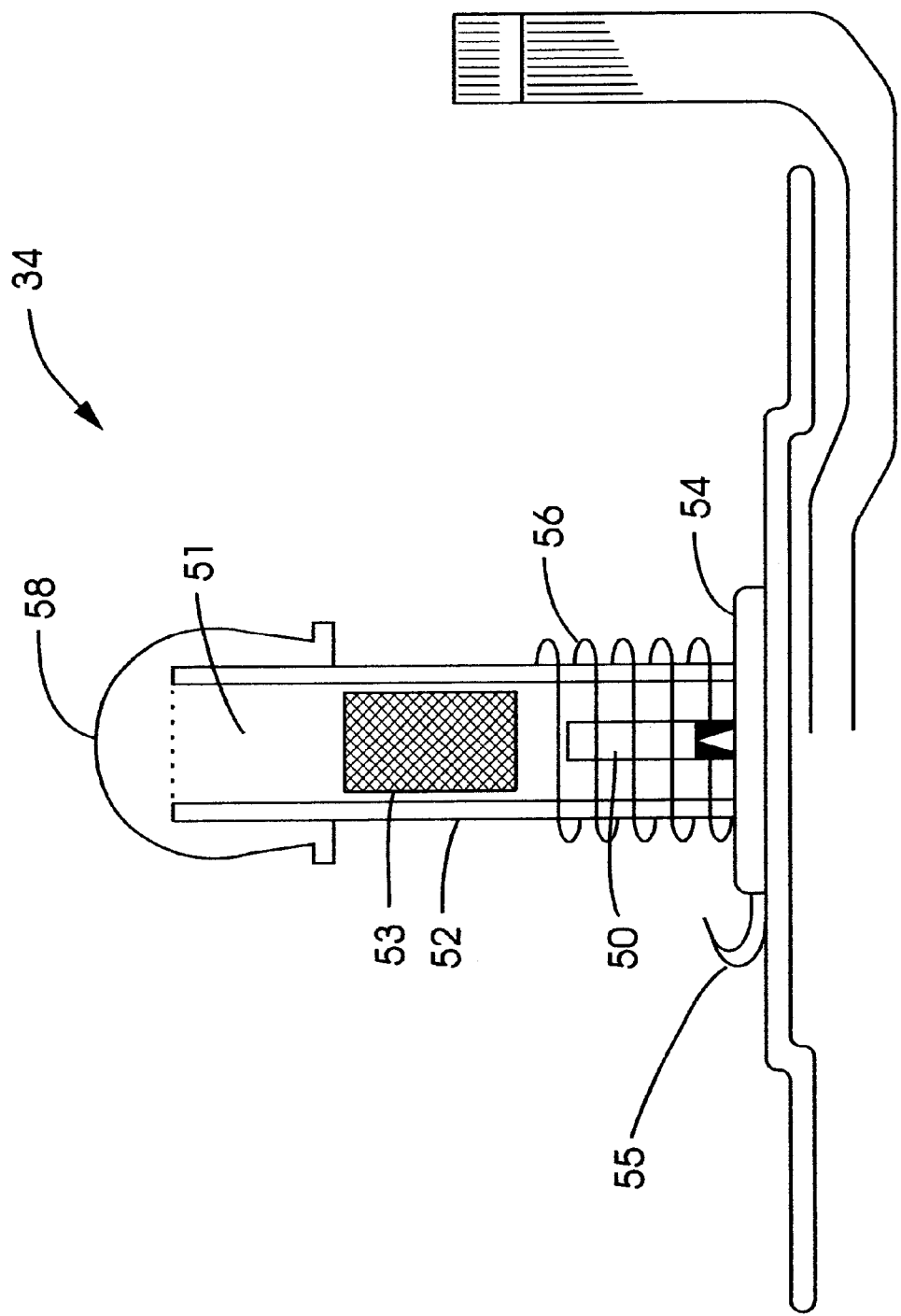
FIG. 4 is side elevation cut away view of the joystick actuator 34 employing magnetic means to achieve tactile feedback of the present invention

FIG. 4 is a side elevation cut away view of the joystick actuator 34 employing magnetic means to achieve tactile feedback of the present invention. The joystick actuator 34 is mounted to keyboard unit 14 between preselected ones of said keys for engagement by a user's finger and includes a post 50. Although the post 50 may be that of a standard TrackPoint™ pointing device, in the preferred embodiment of the invention the post is one that has been cut to approximately 0.100" above the resistive sensor. The magnetic version of the joystick actuator 34 of the present invention generally comprises a manipulation lever 52 mounted upon the post 50. The manipulation lever 52 is preferably cylindrical in shape, made from an insulating material, and has a bore 51 disposed through its longitudinal axis. Wound about the manipulation lever 52 is a coil 56; and disposed within the manipulation lever 52 is a ferromagnetic slug 53. Preferably, coil 56 is wound of #39–40 awg wire and ferromagnetic slug 53 is a Neodymium magnet, Dexter part number 33AC4700B. Contact leads 54 and 55 provide the electrical connection between coil 56 and magnet driver circuit and firmware (not shown). A cap 58 is mounted upon the manipulation lever 52.

During use, the joystick actuator 34 may be depressed by the application of a downward force in order to select an object, icon or one of the windows W1, W2, W3 or W4. It is to be understood that the user may further select or "open" a window or application by the successive application of a series of forces (i.e. by "double clicking") upon a desired object or icon. In so doing, the user need not activate or depress a separate key as, for example, a user would while operating a mouse pointer. That is, while operating a mouse pointer, a user positions cursor 36 and must separately activate a selection by depressing a mouse button.

Upon depressing, or "clicking", joystick actuator 34 an electrical signal is sent to coil 56 which produces a magnetic field that drives ferromagnetic slug 53 upward through the bore of manipulation lever 52 and against cap 58. In so doing, the user senses the force of ferromagnetic slug 53 against joystick actuator 34. The rising ferromagnetic slug 53 hits the underside of cap 58 with a force that is sufficient to provide a feedback that may be detected by the user's fingertip. Moreover, the impact of the ferromagnetic slug 53 striking the underside of cap 58 creates an audible feedback that may be heard by the user as well.

While we have described a preferred embodiment of our keyboard with an integrated pointing device and click buttons with lock down for drag operation, and a method of dragging an object in a computer system having a graphical user interface, it should be apparent to those skilled in the art that our invention can be modified in both arrangement and detail. For example, the illustrated structure could be modified so that the joystick actuator 34 could slide forwardly, rearwardly or sideways in conjunction with downward movement to achieve the locked ON state drag mode. Such movement forward, rearward or sideways of the joystick actuator 34 shall be collectively referred to as "lateral" movement. A pop-up pin could be used to indicate a sideways hook function. Therefore, the protection afforded our invention should only be limited in accordance with the scope of the following claims.

We claim:

1. A manual control input device for use in a keyboard, comprising:

a pointing actuator mounted to the keyboard between preselected ones of the keys for manipulation by a user's finger, said pointing actuator being depressible by said user's finger to perform a click function; and tactile feedback means integrated with said pointing actuator for producing tactile feedback to said user's finger indicating performance of said click function, wherein said tactile feedback means comprises:

a manipulation lever having a bore running therethrough, mounted upon said pointing actuator;

a ferromagnetic slug disposed within the bore of said manipulation lever;

a coil disposed about said manipulation lever, said coil being actuated upon performance of said click function to drive said ferromagnetic slug up said bore to provide said tactile feedback; and a cap mounted to the top of said manipulation lever for engagement with said user's finger and against which said ferromagnetic slug impacts when driven up said bore to provide said tactile feedback.

2. An integrated manual control input device for use in a computer system having a graphical user interface, comprising:

a keyboard unit having a plurality of keys;

a pointing actuator mounted to the keyboard unit between preselected ones of the keys for manipulation by a user's finger, said pointing actuator being depressible by said user's finger to perform a click function; and tactile feedback means integrated with said pointing actuator for producing tactile feedback to said user's finger indicating performance of said click function, wherein said pointing actuator includes a cap for engagement with said user's finger and means for impacting said cap with a moving element upon performance of said click function.

3. The control device according to claims 2 wherein said moving element is a slug of ferromagnetic material that is moved by energizing a coil.

* * * * *